(12) United States Patent
Stahel et al.

(10) Patent No.: US 7,818,905 B1
(45) Date of Patent: Oct. 26, 2010

(54) LICENSE PLATE TRANSPORT MECHANISM

(75) Inventors: Brian K. Stahel, St. Paul, MN (US); Paul H. Plahn, Lino Lakes, MN (US)

(73) Assignee: Altec Products, Inc., Ham Lake, MN (US)

(*) Notice: Subject to any disclaimer, the term of this patent is extended or adjusted under 35 U.S.C. 154(b) by 0 days.

(21) Appl. No.: 11/977,326

(22) Filed: Oct. 24, 2007

Related U.S. Application Data

(60) Provisional application No. 60/854,184, filed on Oct. 25, 2006.

(51) Int. Cl.
G09F 7/00 (2006.01)

(52) U.S. Cl. .............. 40/492; 40/209; 224/496

(58) Field of Classification Search .......... 40/209, 40/211, 200, 492, 654; 224/496, 502, 506, 224/281, 282; 248/222.11, 225.11, 309.2, 248/286.1, 279.1, 285.1, 291.1, 298.1, 274.1, 248/300; 293/117; 296/37.1, 1.07
See application file for complete search history.

(56) References Cited

U.S. PATENT DOCUMENTS

| | | | | |
|---|---|---|---|---|
| 364,196 A * | 5/1887 | Woltmann | .................... | 40/654 |
| 1,044,704 A * | 11/1912 | Stoddard | ..................... | 40/654 |
| 1,259,555 A * | 3/1918 | Reilly | ........................ | 40/211 |
| 1,854,406 A * | 4/1932 | Hughes | ...................... | 224/499 |
| 1,976,146 A * | 10/1934 | Self | ........................... | 224/506 |
| 2,591,196 A * | 4/1952 | Post | ............................ | 40/211 |
| 2,677,206 A * | 5/1954 | Paolini et al. | ................. | 40/211 |
| 2,964,351 A * | 12/1960 | White | ...................... | 296/57.1 |
| 3,796,275 A * | 3/1974 | Bouyer | ...................... | 180/6.4 |
| 4,813,842 A * | 3/1989 | Morton | ...................... | 414/557 |
| 5,957,346 A * | 9/1999 | Schambre et al. | ........ | 224/42.21 |
| 6,167,645 B1 * | 1/2001 | Gasko et al. | .................. | 40/200 |
| 6,757,998 B1 | 7/2004 | Lucatorto | | |
| 7,281,745 B1 * | 10/2007 | Meinke et al. | ............ | 296/26.1 |
| 2003/0127879 A1 * | 7/2003 | Smith | ....................... | 296/57.1 |
| 2004/0089776 A1 * | 5/2004 | Tsuchizaki | ............. | 248/222.11 |

* cited by examiner

*Primary Examiner*—Joanne Silbermann
*Assistant Examiner*—Kristina Staley
(74) *Attorney, Agent, or Firm*—Dicke, Billig & Czaja, PLLC

(57) ABSTRACT

A license plate transport mechanism includes a mounting bracket connectable beneath a vehicle support structure, such as a front bumper of a vehicle. The mounting bracket includes an elongate track with a pivot pin for pivotally mounting a license plate mounting plate. When the mounting plate is at a first end of the track, it pivots to a vertical position that is generally perpendicular to a base of the mounting bracket to display the license plate. The mounting plate is pivotable to a horizontal position generally parallel to the mounting bracket base. Once in the horizontal position, the pivot pin and mounting plate can move toward a second end of the track to store the license plate underneath the vehicle support structure.

11 Claims, 7 Drawing Sheets

US 7,818,905 B1

LICENSE PLATE TRANSPORT MECHANISM

CROSS-REFERENCE TO RELATED APPLICATION

This application claims priority to U.S. Provisional Patent Application No. 60/854,184, filed Oct. 25, 2006.

BACKGROUND

The present invention generally relates to vehicle license plate mounting mechanisms, and more particularly, the present invention relates to a vehicle license plate transport mechanism for storing a license plate out of sight beneath the vehicle. Original equipment manufacturers of automobiles typically provide a fixed license plate mount on the front and rear ends of an automobile. As shown in FIG. 1, exemplary prior art license plate mounts 10 are semi-permanently secured to the front bumper 12 or grill area of an automobile 14, which for automobile enthusiasts, such as antique and/or classic car enthusiasts, may be considered unsightly. Automobile enthusiasts occasionally display their automobiles or enter them in afternoon club drive events. To enhance the aesthetics of the automobile, enthusiasts often remove the license plate and related mounting mechanism and store them out of sight. The license plate and related mounting mechanism must then be reattached to the vehicle before it is driven on public roadways. A license plate mounting mechanism that would permit a license plate to be mounted to a vehicle in such a way that it remains attached to the vehicle but can be stored out of view would be a beneficial improvement in the art.

SUMMARY OF THE INVENTION

A license plate transport mechanism comprises a mounting bracket mountable to a vehicle support structure. The mounting bracket comprises a base having a length and a width and a track which extends the length of the base. A pivot pin is carried in the track of the mounting bracket. A license plate mounting plate pivotally connects to the pivot pin and is movable between a first position and a second position. When the mounting plate is in the first position the mounting plate extends generally perpendicular to a first end of the mounting bracket when the pivot pin is adjacent the first end of the mounting bracket. When the mounting plate is in the second position the mounting plate pivots to a position generally parallel to the mounting bracket base. The pivot pin is movable to a second end of the mounting bracket when the mounting plate is in the second position to store the mounting plate relative to the base.

DETAILED DESCRIPTION

Figure 1:
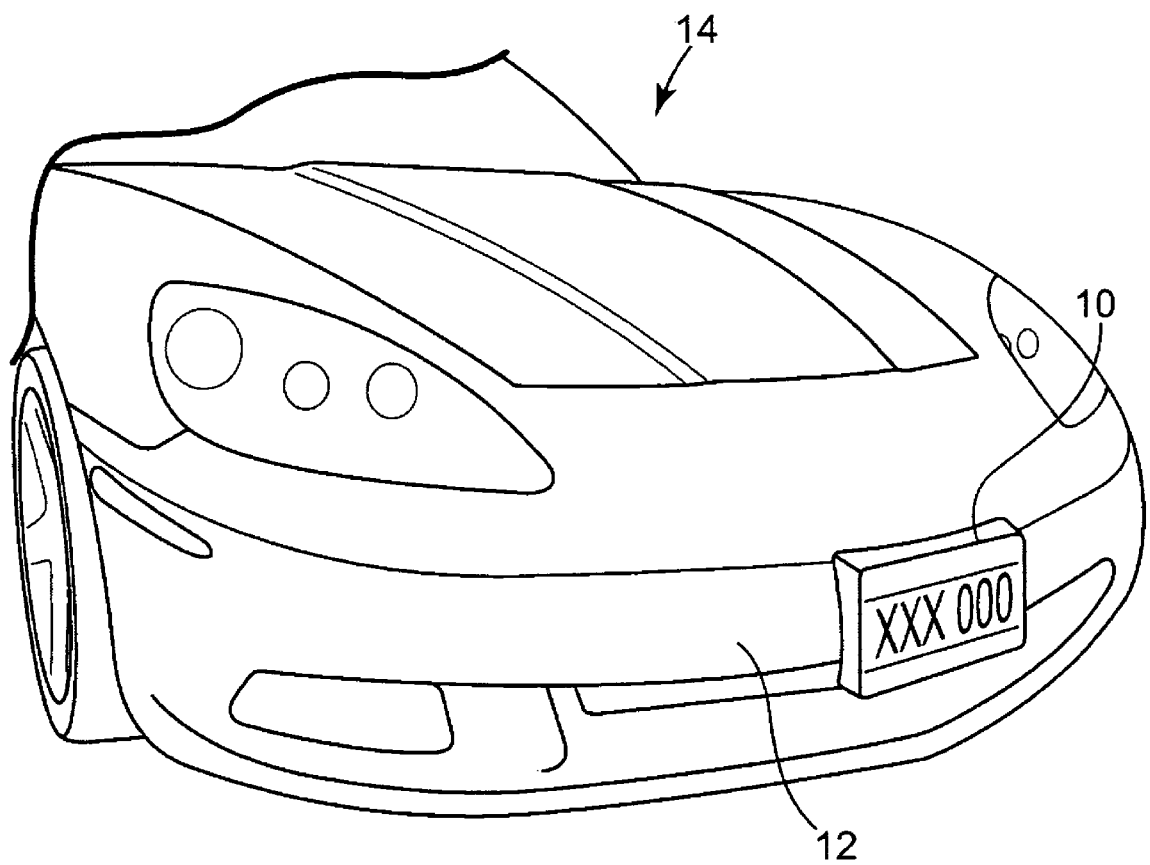
FIG. 1 is a perspective view of a vehicle with a license plate mounting mechanism of the prior art.
Figure 2:
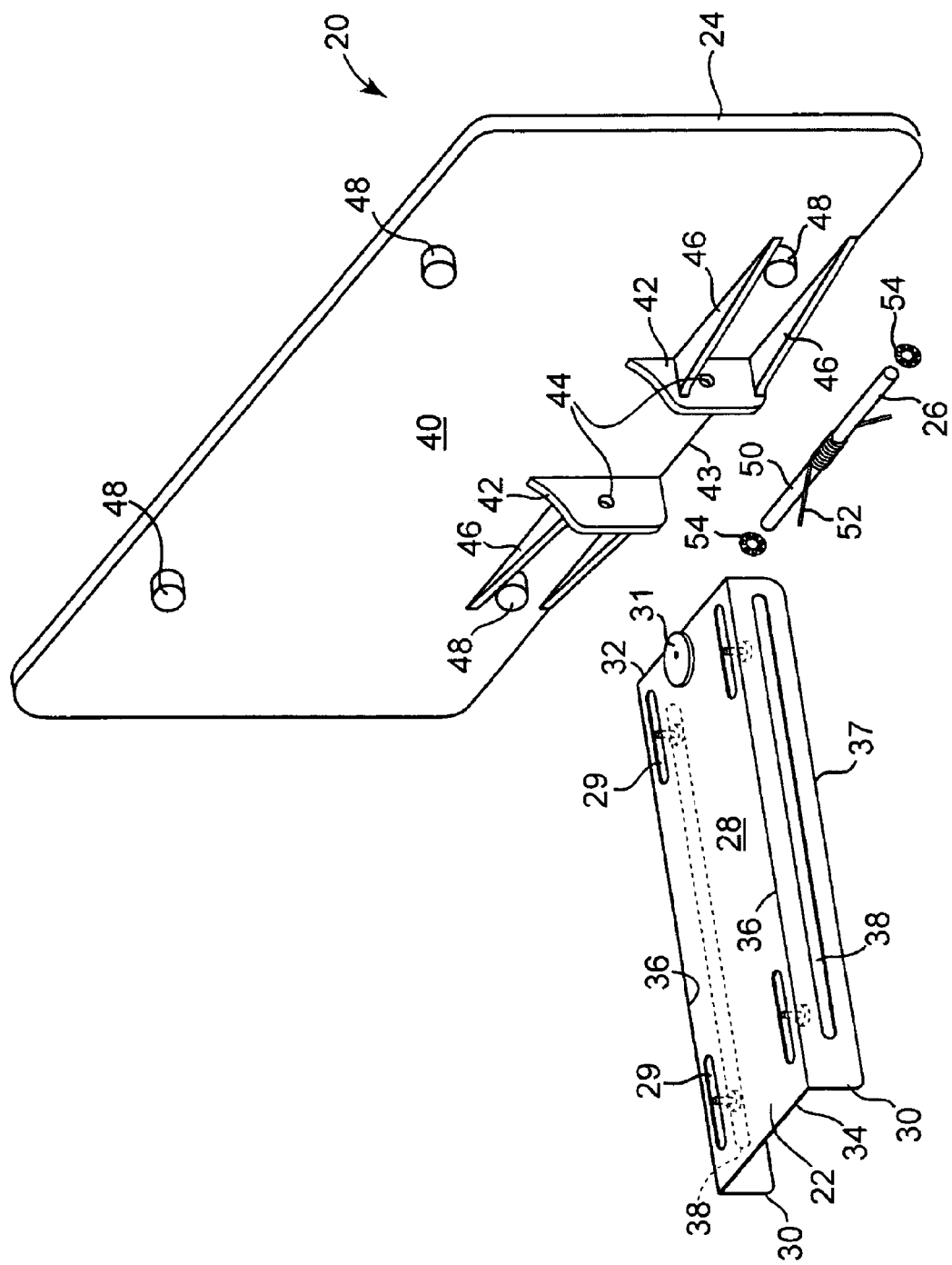
FIG. 2 is an exploded side perspective view of a first embodiment of a license plate transport mechanism of the present invention.

FIG. 2 is an exploded side perspective view of the license plate transport mechanism 20 of the present invention. License plate transport mechanism 20 generally comprises a mounting bracket 22, a license plate mounting plate 24 and a pivot pin assembly 26, which secures mounting plate 24 to mounting bracket 22. In one embodiment, mounting bracket 22 comprises an elongate, generally U-shaped metal frame having a generally planar base 28 and a pair of legs 30 which extend from a first end 32 of base 28 to a second end 34 of base 28 along opposite sides 36 of base 28. Base 28 includes a plurality of elongate openings 29 for mounting base 28 to a support structure of an automobile. An optional cam 31 may be mounted to base 28 adjacent to first end 32. Legs 30 extend from base 28 in a downward direction as viewed in FIG. 2 and are generally perpendicular to base 28, such that legs 30 are generally oriented in parallel planes. In one embodiment, base 28 and legs 30 are formed from a single metal plate by a stamping process. By way of example, base 28 is rectangular in shape and has a length of about 7.75 inches and a width of about 2.25 inches, and each leg 30 is generally rectangular in shape and has a length of about 7.75 inches and a width of about 0.75 inches. Legs 30 include a radiused lower edge 37 at the end of legs 30 corresponding to first end 32 of base 28. Each leg 30 is configured to define a track, which in one embodiment comprises an elongate slot 38 that generally extends between opposite ends of each leg 30.

License plate mounting plate 24 is a generally planar, rectangular plate which generally corresponds to the shape and size of an automobile license plate. Mounting plate 24 has a rear surface 40 and a pair of flanges 42 connected to the rear surface 40 near a lower edge 43 of mounting plate 24. Flanges 42 extend generally perpendicular from rear surface 40 and generally parallel to one another. Flanges 42 are spaced relative to one another by a distance slightly greater than the width of base 28 such that the facing surfaces of flanges 42 are able to straddle the outer surface of each leg 30. Each flange 42 is configured with a mounting hole 44, such that the mounting holes 44 are oriented on a common axis that is spaced from and generally parallel to rear surface 40. Flanges 42 may be reinforced by one or more support ribs 46 connected to rear surface 40 and each flange 42. Mounting plate 24 may be formed from a suitable plastic material in a conventional injection molding process and may include a plurality of threaded receptacles 48 capable of receiving mounting screws for connecting a license plate on the front surface of mounting plate 24.

Pivot pin assembly 26 includes a pin 50, a spring 52 and a pair of retainer clips 54 which are mountable to opposite ends of pin 50. Pivot pin assembly 26 secures mounting plate 24 to mounting bracket 22 by passing pin 50 through mounting holes 44 of flanges 42 and the elongated slots 38 of legs 30. In one embodiment, spring 52 is a helically wound wire spring which is positioned over pin 50 so as to be positioned between legs 30 when license plate transport mechanism 20 is fully assembled. Retainer clips 54 are secured to opposite ends of pin 50 to maintain pivot pin assembly in place after mounting plate 24 is connected to mounting bracket 22.

Figure 3:
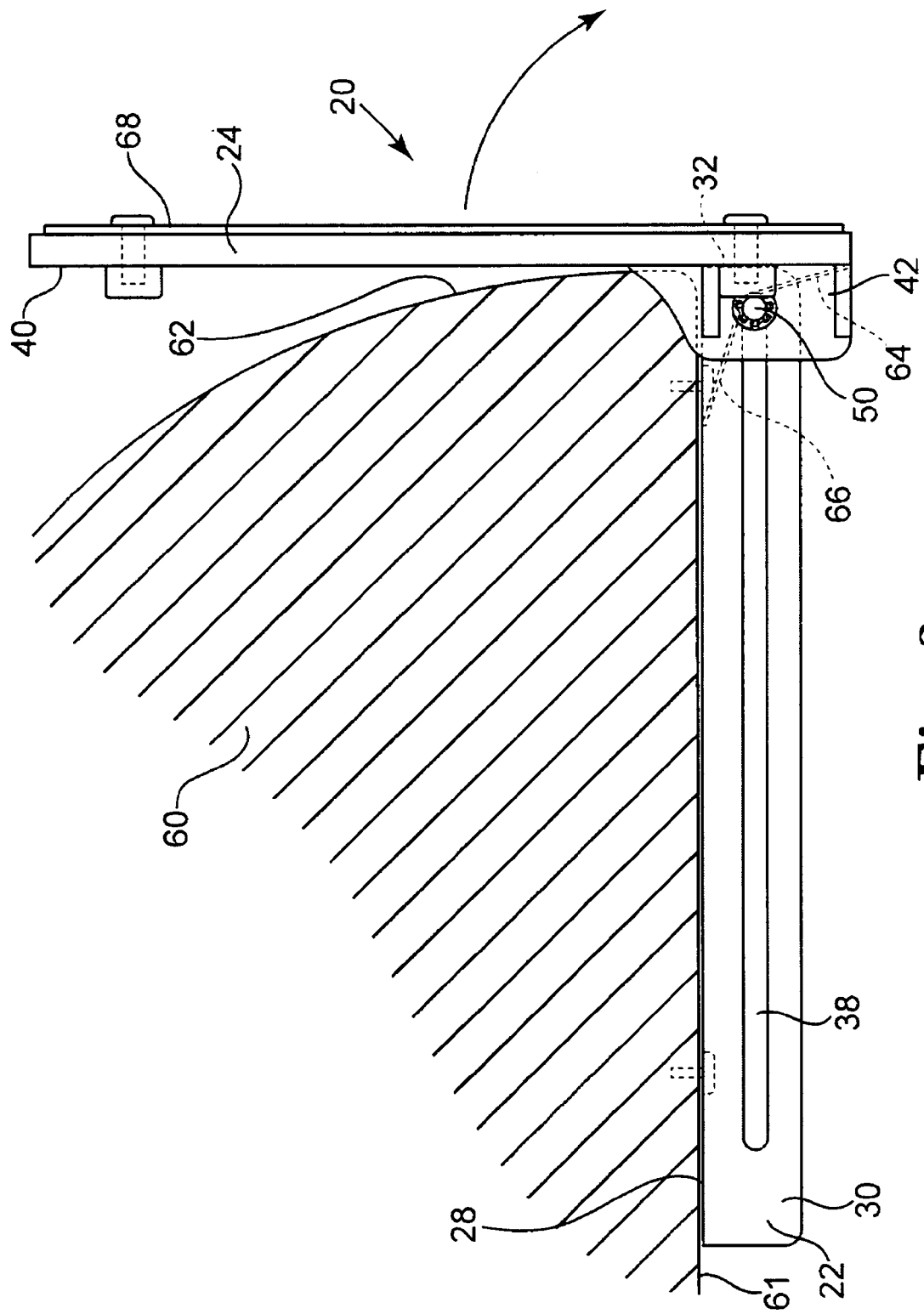
FIG. 3 is a side diagrammatic view of the license plate transport mechanism of FIG. 2 mounted to a vehicle support structure with the license plate mount deployed.

FIG. 3 is a side diagrammatic view of license plate transport mechanism 20 mounted to a vehicle support structure 60, such as a front bumper of a vehicle, with mounting plate 24 in front of support structure 60 and generally perpendicular to base 28 of mounting bracket 22. Mounting bracket 22 may be mounted to support structure 60 by drilling holes in a lower surface 61 of support structure 60 corresponding to the elongate openings 29 in base 28 and securing base 28 to the support structure 60 with threaded connectors such as a bolt or a screw. Mounting bracket 22 is positioned with first end 32 generally aligned with the front end 62 of support structure 60. As shown in FIG. 3, the position of mounting holes 44 and elongate slot 38 are such that when pin 50 is at the forward-most extent of slot 38, rear surface 40 of mounting plate 24 is spaced from legs 30 at first end 32. A first leg 64 of spring 52 contacts rear surface 40 of mounting plate 24, and a second leg 66 of spring 52 contacts the inner surface of base 28 of mounting bracket 22. Spring 52 is pre-tensioned prior to assembly of pivot pin assembly 26 relative to mounting bracket 22 and mounting plate 24 such that mounting plate 24 is biased toward the perpendicular configuration shown in FIG. 3 to permit viewing of the vehicle's license plate 68.

Figure 4:
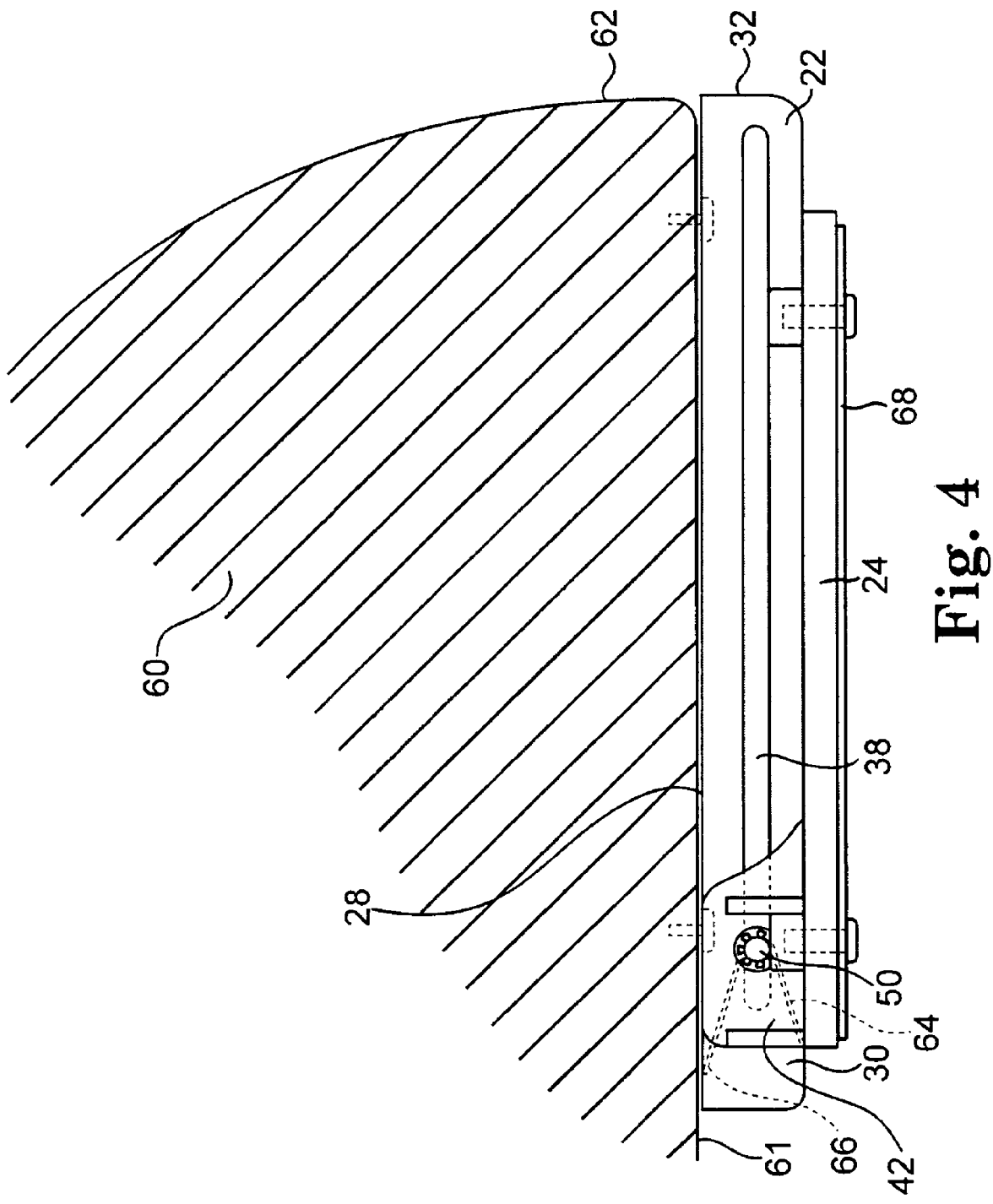
FIG. 4 is a side diagrammatic view of the license plate transport mechanism of FIG. 3 with the license plate mount stored under the vehicle support structure.

As shown in FIGS. 3 and 4, the mounting plate 24 can be stored out of view by manually pivoting the mounting plate 24 clockwise until mounting plate 24 is generally parallel with base 28. Pivot pin assembly 26 allows mounting plate 24 to slide along the elongate slots 38 to store mounting plate 24 beneath the vehicle support structure 60 out of view of the front end 62. In an alternative embodiment, mounting bracket 22 may be configured to define a different track arrangement which permits mounting plate 24 to be moved from first end 32 toward second end 34.

When it is necessary or desirable to view the vehicle license plate, mounting plate 24 is manually moved forward until pin 50 reaches the forward-most extent of elongate slots 38, at which point spring 50 urges mounting plate 24 to pivot into and remain in the perpendicular, extended position against the front end 62 of the vehicle support structure 60 (FIG. 3). In one embodiment, rear surface 40 of mounting plate is provided with a pad (not shown) that cushions the contact between mounting plate 24 and the front end 62 of the vehicle support structure 60.

Figure 5:
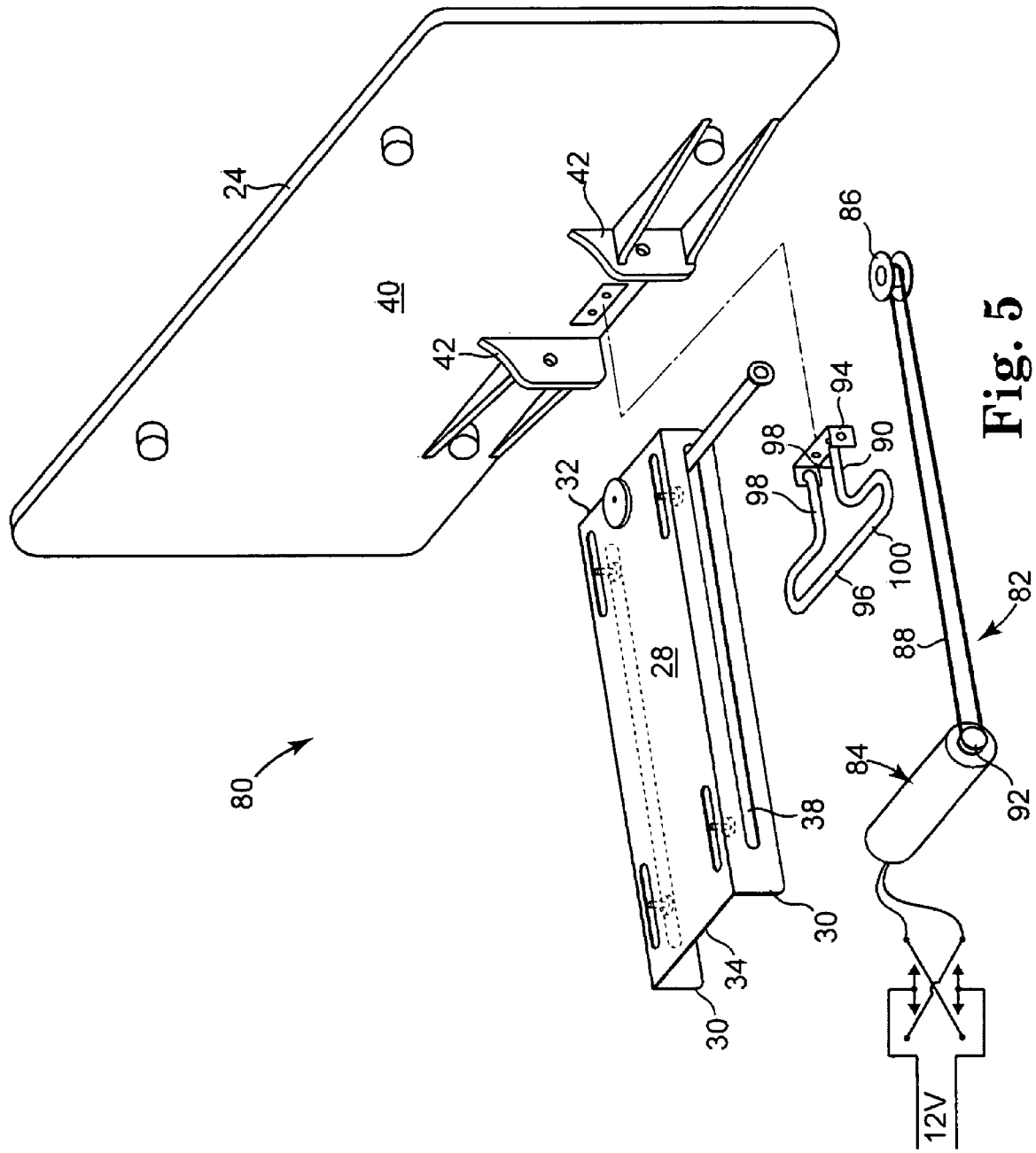
FIG. 5 is an exploded side perspective view of a second embodiment of a license plate transport mechanism of the present invention.

FIG. 5 is an exploded side perspective view of a second, automated embodiment of license plate transport mechanism 80. License plate transport mechanism 80 is substantially identical to license plate transport mechanism 20 with the inclusion of a power transport system 82 for deploying and storing mounting plate 24. Power transport system 82 generally includes a motor 84, a return pulley wheel 86, a transport cable 88 and a yoke pin assembly 90. In one embodiment motor 84 is an electric motor mounted to the base 28, between legs 30 near second end 34. Motor 84 includes a drive pulley 92. Return pulley wheel 86 is mounted to base 28 adjacent to first end 32. The transport cable 88 engages the drive pulley 92 and the return pulley wheel 86.

Figure 6A:
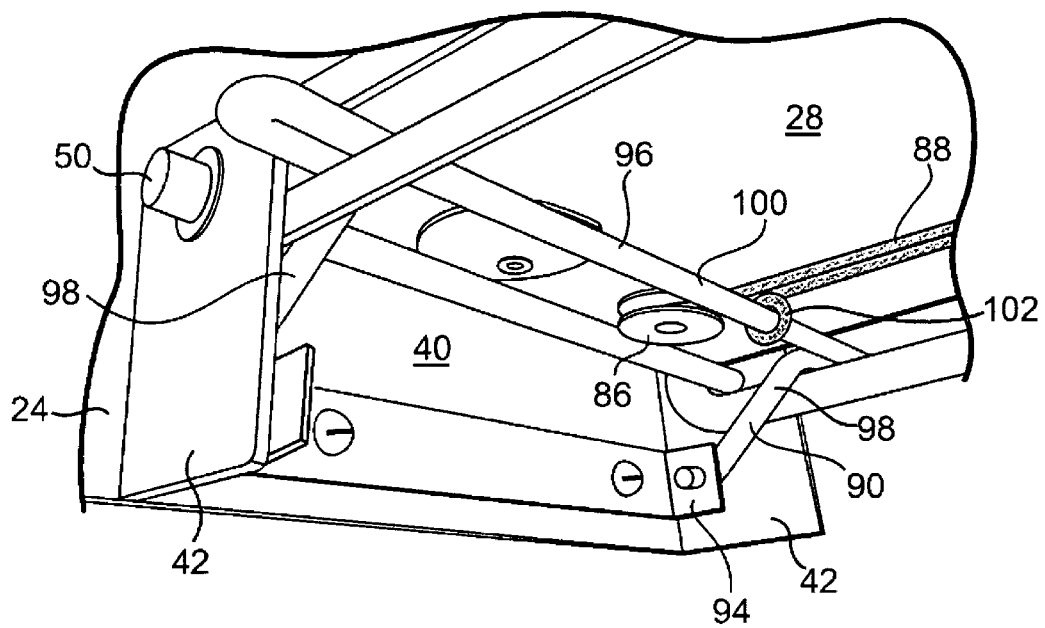
FIG. 6A is a bottom perspective view of a first end portion of a mounting bracket of the license plate transport mechanism with a first portion of an automated transport assembly for the license plate mount.
Figure 6B:
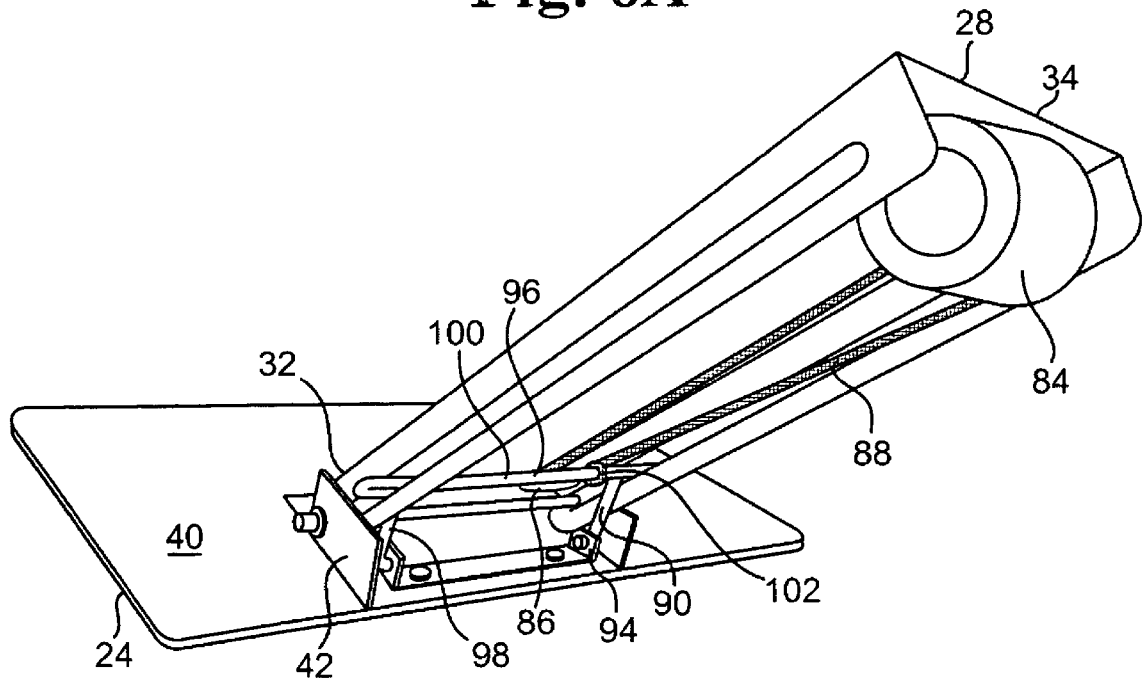
FIG. 6B is a bottom perspective view of a second end portion of the mounting bracket of FIG. 6A with a second portion of the automated transport assembly for the license plate mount.

The yoke pin assembly 90 comprises a U-shaped bracket 94 that mounts with screws or other suitable connector to the rear surface 40 of mounting plate 24 between flanges 42. Pivotally connected to the legs of the U-shaped bracket 94 is a yoke pin 96. In one embodiment, yoke pin 96 is a continuous metal wire configured to define a pair of generally parallel legs 98, which pivotally engage holes formed in the legs of the U-shaped bracket 94, and a transverse loop 100 having a width greater than a spacing of the legs 98. Legs 98 extend at an angle relative to the transverse loop 100 to connect to bracket 94. As shown in FIG. 6A, when the mounting plate 24 is in the perpendicular configuration, the point of attachment of bracket 94 to rear surface 40 of mounting plate 24 is located below the level of the transverse loop 100. The transverse loop 100 is sized to be positioned within the elongated slots 38 with the ends of transverse loop 100 defining a width of loop 100 that is greater than the spacing of legs 30. As shown in FIGS. 6A and 6B, the transverse loop 100 of yoke pin 96 is secured to a fixed location 102 on the transport cable 88. When motor 84 is operated in a first direction, yoke pin assembly 90 is pulled by transport cable 88 toward second end 34, thereby moving mounting plate 24 to the stored position underneath the vehicle support structure 60. When motor 84 is operated in a second direction opposite the first direction, yoke pin assembly 90 is pulled by transport cable 88 toward first end 32 of base 28, thereby deploying the mounting plate 24 to the perpendicular, extended position. Motor 84 may be connected to a double throw switch as shown in FIG. 5, or a remote control receiver for remote operation.

Figure 7:
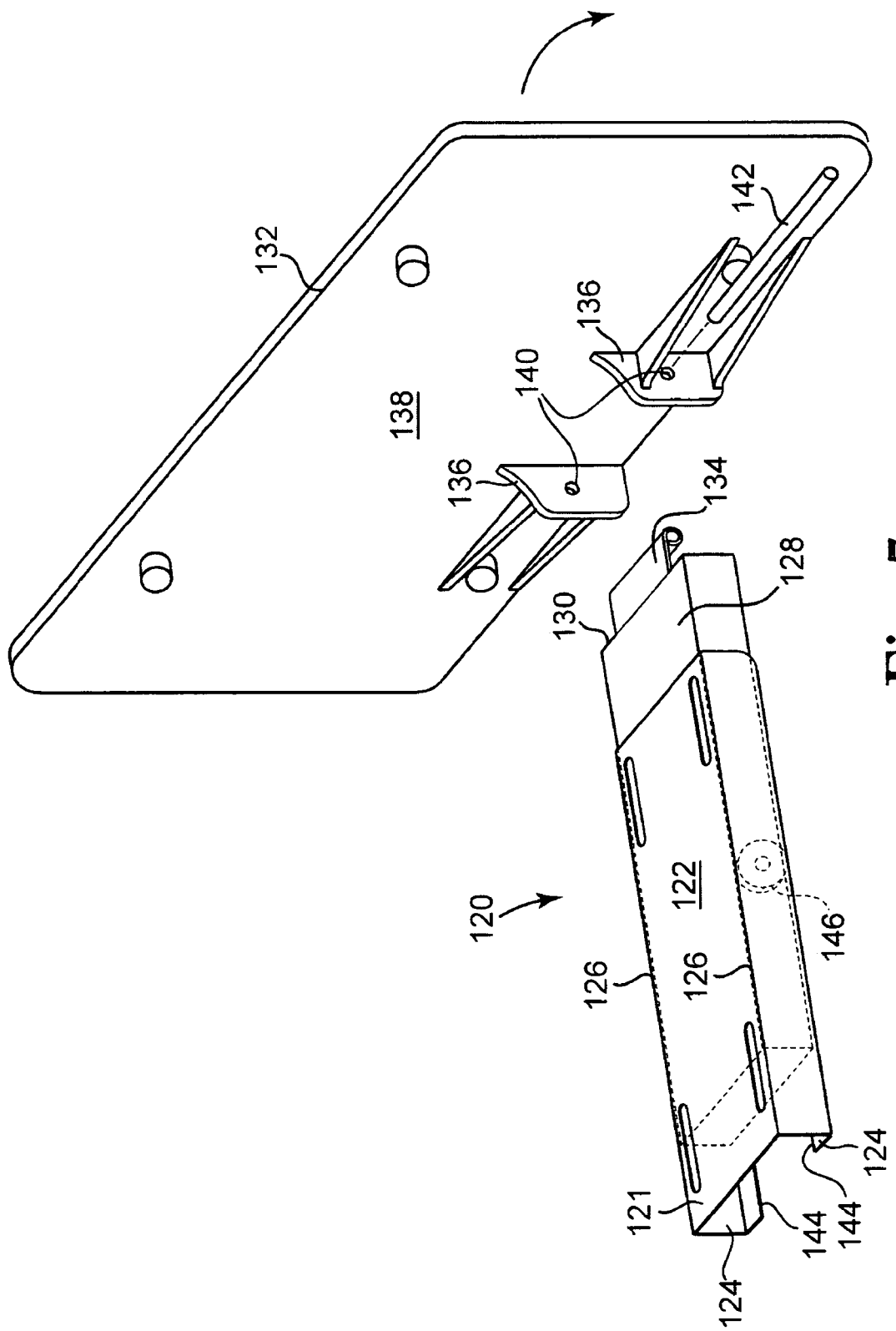
FIG. 7 is an exploded side perspective view of an alternative track configuration for the license plate transport mechanism of the present invention.

FIG. 7 is an exploded side perspective view of an alternative track configuration for the license plate transport mechanism 120. As shown in FIG. 7, mounting bracket 121 comprises a base 122 and facing first and second C-shaped channels 124 extending the length of base 122 on opposite sides 126 of base 122. A slide member 128 is sized to fit between and move along the C-shaped channels 124. Slide member 128 may comprise a rectangular polymer block or a U-shaped metal frame. Connected to end 130 of slide member 128, adjacent license plate mounting plate 132, is a cylindrical pivot mount 134. Mounting flanges 136 extending from rear surface 138 of mounting plate 132 each include a mounting hole 140 and are connectable to the pivot mount 134 of slide member 128 with a pivot pin 142. Pivot mount 134 and flanges 136 are configured to permit mounting plate 132 to pivot clockwise from the perpendicular configuration shown in FIG. 7 until mounting plate 132 generally parallel to base 122. The spacing of mounting flanges 136 is selected to permit flanges 136 to pass between facing edges 144 of channels 124 and allow slide member 128 and mounting plate 132 to move along channels 124 to store mounting plate 132 beneath mounting bracket 121. A mechanical stop may be associated with one or both of the C-shaped channels, or the slide member to limit the range of movement of slide member 128 along channels 124. In one embodiment, slide member 128 may alternatively include one or more wheels 146 along opposite sides of slide member 128 to engage the C-shaped channels 124. Other track configurations that permit a longitudinal range of travel of a pivotal connector carrying a license plate mounting plate will be apparent to those of skill in the art consistent with the scope of exemplary embodiments of the present invention disclosed herein.

Although specific embodiments have been illustrated and described herein, it will be appreciated by those of ordinary skill in the art that a variety of alternate and/or equivalent implementations may be substituted for the specific embodiments shown and described without departing from the scope of the present invention. Therefore, it is intended that this invention be limited only by the claims and the equivalents thereof.

What is claimed is:

1. A license plate transport mechanism mountable to a vehicle support structure, the license plate transport mechanism comprising:

a mounting bracket, the mounting bracket comprising a base having a length and a width and a track extending the length of the base along opposite sides of the base, the base configured for connection to a lower surface of the vehicle support structure;

a pivot pin carried in the track of the mounting bracket; and a mounting plate having a front surface configured for mounting a license plate and a rear surface facing the pivot pin, the mounting plate being pivotally connected to the pivot pin and movable between a first position and a second position, wherein in the first position the mounting plate extends generally perpendicular to a first end of the mounting bracket when the pivot pin is adjacent the first end of the mounting bracket so as to cover the mounting bracket, and wherein in the second position the mounting plate pivots to a position generally parallel to the mounting bracket base with the mounting plate front surface facing away from the lower surface of the vehicle support structure, the pivot pin movable to a second end of the mounting bracket when the mounting plate is in the second position.

2. The license plate transport mechanism of claim 1 and further comprising:

biasing means engaging the mounting plate for biasing the mounting plate towards the first position.

3. The license plate transport mechanism of claim 2, wherein the biasing means comprises a helical metal spring having a wire coil, a first leg and a second leg, the wire coil positioned on the pivot pin, the first leg engaging the base of the mounting bracket, the second leg engaging the rear surface of the mounting plate.

4. The license plate transport mechanism of claim 1, wherein the mounting plate comprises:

first and second spaced flanges extending generally perpendicular from a rear surface of the mounting plate, the first and second flanges each configured to define a hole, the pivot pin engaging the holes of the first and second flanges; and a support rib connected to each of the first and second flanges and the rear surface of the mounting plate.

5. The license plate transport mechanism of claim 1 wherein the track comprises first and second elongate legs connected to the mounting bracket base on opposite sides of the base, the first and second legs extending generally perpendicular to the base, each leg configured to define an elongate slot, wherein the pivot pin is positioned in the elongate slots of the first and second legs.

6. The license plate transport mechanism of claim 1 wherein the track comprises first and second elongate C-shaped channels connected to the mounting bracket base on opposite sides of the base, the transport mechanism further comprising a sliding member configured to move along the first and second C-shaped channels, the sliding member comprising a pivot pin mount at one end for pivotal connection of the pivot pin.

7. The license plate transport mechanism of claim 1 and further comprising:

a motor mounted to the base adjacent to the second end of the mounting bracket, the motor comprising a drive pulley;

a return pulley wheel mounted to the base adjacent to the first end of the mounting bracket;

a transport cable engaging the chive pulley and the return pulley wheel; and a yoke pin having a first portion connected to the mounting plate, the yoke pin further having a second portion carried in the track of the mounting bracket and secured to the transport cable, the first portion of the yoke pin being lower than the second portion of the yoke pin when the mounting plate is in the first position, wherein the yoke pin causes the mounting plate to pivot about the pivot pin in response to movement of the transport cable when the mounting plate is moving between the first position and the second position.

8. A license plate transport mechanism comprising:

a pivot pin;

a mounting bracket having a base mountable to a lower surface of a vehicle support structure, the mounting bracket comprising means for supporting the pivot pin for linear movement from a first end of the mounting bracket to a second end of the mounting bracket; and a mounting plate having a front surface configured for mounting a license plate and a rear surface facing the pivot pin, the mounting plate being pivotally connected to the pivot pin and movable between a first position generally perpendicular to the mounting bracket so as to cover the mounting bracket and a second position generally parallel to the mounting bracket with the mounting plate front surface facing away from the lower surface of the vehicle support structure, the mounting plate being movable between the first and second positions when the pivot pin is at the first end of the mounting bracket, wherein in the pivot pin is moveable to the second end of the mounting bracket when the mounting plate is in the second position.

9. The license plate transport mechanism of claim 8 wherein the mounting plate is biased toward the first position.

10. The license plate transport mechanism of claim 8 wherein mounting bracket comprises the base having first and second sides and first and second ends, and wherein the means for supporting the pivot pin comprises a first leg connected to a first side of the base and extending in a first direction, generally perpendicular to the base, and a second leg connected to the second side of the base and extending in the first direction, generally perpendicular to the base and generally parallel to the first leg, the first and second legs extending in a second direction between the first and second ends of the base, wherein the first and second legs each comprise an elongate slot extending between the first and second ends, the pivot pin being carried in the elongate slots of the first and second legs.

11. The license plate transport mechanism of claim 8 wherein mounting bracket comprises a base having first and second sides and first and second ends, the first and second ends of the base being coincident with the first and second ends, respectively of the mounting bracket, and wherein the means for supporting the pivot pin comprises first and second elongate C-shaped channels connected to the mounting bracket base on opposite sides of the base, and a sliding member configured to move along the first and second C-shaped channels, the sliding member comprising a pivot pin mount at one end for pivotal connection of the pivot pin.

* * * * *